(12) United States Patent
Yacoub (10) Patent No.: US 9,103,247 B2
(45) Date of Patent: Aug. 11, 2015

(54) EXHAUST SYSTEM AND METHOD FOR MITIGATING DEGRADATION OF COMPONENTS OF A TURBOCHARGED ENGINE WITH EXHAUST GAS RECIRCULATION

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 654 days.

(21) Appl. No.: 13/267,788

(22) Filed: Oct. 6, 2011

(65) Prior Publication Data

US 2012/0090582 A1    Apr. 19, 2012

(30) Foreign Application Priority Data

Oct. 13, 2010   (DE) .......................... 10 2010 038 153

(51) Int. Cl.
*F01L 1/34* (2006.01)
*F01N 9/00* (2006.01)
*F02D 41/02* (2006.01)
*F02D 41/00* (2006.01)

(52) U.S. Cl.
CPC .............. *F01N 9/00* (2013.01); *F02D 41/0055* (2013.01); *F02D 41/029* (2013.01); *F01N 2560/05* (2013.01); *Y02T 10/47* (2013.01)

(58) Field of Classification Search
USPC ......... 123/25 A, 25 C, 568.12, 299, 300, 305, 123/90.1, 90.23, 90.15, 703, 697, 345, 672; 60/274, 278, 279, 309, 311, 320, 321, 60/605.2, 285, 286, 295, 276
See application file for complete search history.

(56) References Cited

U.S. PATENT DOCUMENTS

| 5,724,810 | A | 3/1998 | Hosoya et al. |
| 5,875,628 | A | 3/1999 | Mitsutani |
| 6,195,985 | B1 | 3/2001 | del Re et al. |
| 6,304,813 | B1 | 10/2001 | Ikeda et al. |
| 6,378,297 | B1 | 4/2002 | Ito et al. |
| 6,394,062 | B2 * | 5/2002 | Daly et al. ................ 123/198 E |
| 6,432,168 | B2 | 8/2002 | Schonauer |
| 6,457,466 | B1 * | 10/2002 | Ritter et al. .................. 123/676 |

(Continued)

FOREIGN PATENT DOCUMENTS

| DE | 69632510 T2 | 5/2005 |
| DE | 102008001910 A1 | 11/2009 |

(Continued)

OTHER PUBLICATIONS

Garry Anthony Zawacki et al., "System for an Engine Having a Particulate Matter Sensor," U.S. Appl. No. 12/643,563, filed Dec. 21, 2009, 40 pages.

(Continued)

*Primary Examiner* — Thomas Moulis
*Assistant Examiner* — Joseph Dallo
(74) *Attorney, Agent, or Firm* — Julia Voutyras; Alleman Hall McCoy Russell & Tuttle LLP (57) ABSTRACT

A system and method for controlling an engine is described. In one example, an actuator is adjusted to reduce the possibility of degradation of an engine component. The method may provide increase engine compon ent operational life so as to improve engine emissions during the life cycle of the engine.

20 Claims, 5 Drawing Sheets

(56) References Cited

U.S. PATENT DOCUMENTS

| | | | |
|---|---|---|---|
| 6,520,142 B2 | 2/2003 | Nogi et al. | |
| 6,634,210 B1* | 10/2003 | Bosch et al. | 73/23.33 |
| 6,738,702 B2 | 5/2004 | Kolmanovsky et al. | |
| 6,817,174 B1* | 11/2004 | Igarashi et al. | 60/295 |
| 6,826,905 B2 | 12/2004 | Gui et al. | |
| 6,964,158 B2* | 11/2005 | Abdul-Khalek | 60/278 |
| 6,971,258 B2* | 12/2005 | Rhodes et al. | 73/28.01 |
| 7,062,904 B1 | 6/2006 | Hu et al. | |
| 7,131,263 B1* | 11/2006 | Styles | 60/278 |
| 7,167,792 B1 | 1/2007 | Kolmanovsky et al. | |
| 7,299,626 B2 | 11/2007 | Barasa et al. | |
| 7,482,303 B2 | 1/2009 | Bosteels | |
| 7,526,914 B2 | 5/2009 | Nakano | |
| 7,765,792 B2 | 8/2010 | Rhodes et al. | |
| 7,900,500 B2* | 3/2011 | Krafthefer | 73/28.01 |
| 7,958,730 B2* | 6/2011 | Stewart | 60/612 |
| 7,963,143 B2 | 6/2011 | Baumann et al. | |
| 7,966,862 B2* | 6/2011 | Gualtieri et al. | 73/28.01 |
| 8,030,086 B2 | 10/2011 | Schmidt et al. | |
| 8,347,611 B2* | 1/2013 | Hepburn et al. | 60/295 |
| 2001/0050067 A1* | 12/2001 | Sato | 123/90.17 |
| 2002/0088442 A1* | 7/2002 | Hansen et al. | 123/536 |
| 2003/0010328 A1* | 1/2003 | Mahakul et al. | 123/568.17 |
| 2003/0200745 A1 | 10/2003 | van Nieuwstadt et al. | |
| 2005/0019578 A1 | 1/2005 | Bosteels | |
| 2006/0090732 A1* | 5/2006 | Shibagaki | 123/406.13 |
| 2006/0123770 A1 | 6/2006 | Pozar et al. | |
| 2006/0179825 A1 | 8/2006 | Hu et al. | |
| 2007/0056395 A1* | 3/2007 | Bae et al. | 73/865.5 |
| 2007/0062179 A1 | 3/2007 | Leone | |
| 2007/0068157 A1* | 3/2007 | Kurtz | 60/605.2 |
| 2007/0079614 A1 | 4/2007 | Barbe et al. | |
| 2007/0089399 A1* | 4/2007 | Rhodes et al. | 60/278 |
| 2007/0125075 A1 | 6/2007 | Zanini-Fisher et al. | |
| 2007/0220873 A1 | 9/2007 | Bosteels | |
| 2007/0261556 A1* | 11/2007 | Kasai et al. | 96/74 |
| 2008/0022677 A1 | 1/2008 | Barbe et al. | |
| 2008/0087005 A1 | 4/2008 | Wahl et al. | |
| 2008/0087012 A1* | 4/2008 | Konstandopoulos | 60/311 |
| 2008/0087101 A1* | 4/2008 | Konstandopoulos | 73/861.42 |
| 2008/0184774 A1 | 8/2008 | Aoki | |
| 2008/0196400 A1 | 8/2008 | Treiber | |
| 2008/0202100 A1 | 8/2008 | Komatsu et al. | |
| 2008/0283025 A1 | 11/2008 | Sato | |
| 2009/0018751 A1 | 1/2009 | Buckland et al. | |
| 2009/0019918 A1* | 1/2009 | Baars et al. | 73/23.33 |
| 2009/0077954 A1 | 3/2009 | Winsor et al. | |
| 2009/0120071 A1 | 5/2009 | Gandhi et al. | |
| 2009/0193796 A1 | 8/2009 | Wei et al. | |
| 2009/0266058 A1* | 10/2009 | Kesse et al. | 60/295 |
| 2010/0024787 A1* | 2/2010 | Chi | 123/568.11 |
| 2010/0031733 A1* | 2/2010 | Bollinger et al. | 73/28.04 |
| 2010/0050616 A1* | 3/2010 | Lee et al. | 60/299 |
| 2010/0095673 A1* | 4/2010 | Vigild et al. | 60/605.2 |
| 2010/0101529 A1 | 4/2010 | Lewis et al. | |
| 2010/0121558 A1* | 5/2010 | Gentile et al. | 701/105 |
| 2010/0212295 A1 | 8/2010 | Narayanaswamy et al. | |
| 2010/0275581 A1 | 11/2010 | Wada et al. | |
| 2010/0275582 A1 | 11/2010 | Wada et al. | |
| 2011/0041483 A1 | 2/2011 | Kapparos | |
| 2011/0047985 A1* | 3/2011 | Zawacki et al. | 60/286 |
| 2011/0072783 A1 | 3/2011 | Hepburn et al. | |
| 2011/0072784 A1 | 3/2011 | Hepburn et al. | |
| 2011/0072787 A1 | 3/2011 | Hubbard et al. | |
| 2011/0072791 A1 | 3/2011 | Bidner et al. | |
| 2011/0072794 A1 | 3/2011 | Van Nieuwstadt et al. | |
| 2011/0072795 A1 | 3/2011 | Kerns et al. | |
| 2011/0072803 A1 | 3/2011 | Van Nieuwstadt et al. | |
| 2011/0072804 A1 | 3/2011 | Van Nieuwstadt et al. | |
| 2011/0073088 A1 | 3/2011 | Hubbard et al. | |

FOREIGN PATENT DOCUMENTS

| | | |
|---|---|---|
| EP | 0952323 A2 | 10/1999 |
| EP | 1245817 A2 | 10/2002 |
| EP | 1319811 A1 | 6/2003 |
| JP | 2001263053 A | 9/2001 |
| JP | 2001263130 A | 9/2001 |
| JP | 2004232544 A | 8/2004 |
| JP | 2004251230 A | 9/2004 |
| JP | 2006161572 A | 6/2006 |
| JP | 2007291980 A | 11/2007 |
| JP | 2009030547 A | 2/2009 |
| JP | 2009041386 A | 2/2009 |
| JP | 2009079487 A | 4/2009 |
| JP | 2009085054 A | 4/2009 |
| JP | 2009228448 A | 10/2009 |
| WO | 2008127755 A2 | 10/2008 |
| WO | 2008131789 A1 | 11/2008 |
| WO | 2009087818 A1 | 7/2009 |
| WO | 2009087819 A1 | 7/2009 |

OTHER PUBLICATIONS

Garry Anthony Zawacki et al., "Method for Evaluating Degradation of a Particulate Matter Sensor," U.S. Appl. No. 12/643,568, filed Dec. 21, 2009, 38 pages.

Garry Anthony Zawacki et al., "Method for Evaluating Degradation of a Particulate Matter Sensor After an Engine Start," U.S. Appl. No. 12/643,575, filed Dec. 21, 2009, 38 pages.

Michiel J. Van Nieuwstadt et al., "System and Method for Regenerating a Particulate Filter for a Direct Injection Engine," U.S. Appl. No. 12/620,354, filed Nov. 17, 2009, 47 pages.

Michiel J. Van Nieuwstadt et al., "Method for Adjusting Boost Pressure While Regenerating a Particulate Filter for a Direct Injection Engine," U.S. Appl. No. 12/620,366, filed Nov. 17, 2009, 46 pages.

Michiel J. Van Nieuwstadt et al., "System for Regenerating a Particulate Filter and Controlling EGR," U.S. Appl. No. 12/620,374, filed Nov. 17, 2009, 46 pages.

James Michael Kerns et al., "Method for Regenerating a Particulate Filter for a Boosted Direct Injection Engine," U.S. Appl. No. 12/620,386, filed Nov. 17, 2009, 46 pages.

Jeffrey Scott Hepburn et al., "System and Method for Regenerating a Particulate Filter Accompanied by a Catalyst," U.S. Appl. No. 12/638,511, filed Dec. 15, 2009, 53 pages.

Jeffrey Scott Hepburn et al., "System and Method for Regenerating a Particulate Filter," U.S. Appl. No. 12/638,533, filed Dec. 15, 2009, 55 pages.

Helmut Hans Ruhland et al., "Method for Controlling Spark for Particulate Filter Regenerating," U.S. Appl. No. 12/638,555, filed Dec. 15, 2009, 52 pages.

Carolyn Parks Hubbard et al., "Fuel Control for Spark Ignited Engine Having a Particulate Filter System," U.S. Appl. No. 12/638,595, filed Dec. 15, 2009, 52 pages.

Carolyn Parks Hubbard et al., "Method for Controlling Fuel of a Spark Ignited Engine While Regenerating a Particulate Filter" U.S. Appl. No. 12/638,633, filed Dec. 15, 2009, 53 pages.

William C. Ruona et al., "Gasoline Particulate Filter Regeneration and Diagnostics," U.S. Appl. No. 12/689,930, filed Jan. 19, 2010, 60 pages.

David K. Bidner et al., "Particulate Filter Regeneration During Engine Shutdown," U.S. Appl. No. 12/629,743, filed Dec. 2, 2009, 41 pages.

David K. Bidner et al., "Particulate Filter Regeneration During Engine Shutdown," U.S. Appl. No. 12/610,991, filed Nov. 2, 2009, 65 pages.

David K. Bidner et al., "Particulate Filter Regeneration in an Engine," U.S. Appl. No. 12/611,002, filed Nov. 2, 2009, 64 pages.

David K. Bidner et al., "Particulate Filter Regeneration in an Engine," U.S. Appl. No. 12/611,009, filed Nov. 2, 2009, 65 pages.

David K. Bidner et al., "Particulate Filter Regeneration in an Engine Coupled to an Energy Conversion Device," U.S. Appl. No. 12/611,019, filed Nov. 2, 2009, 64 pages.

(56) References Cited

OTHER PUBLICATIONS

David K. Bidner et al., "Particulate Filter Regeneration in an Engine," U.S. Appl. No. 12/611,027, filed Nov. 2, 2009, 52 pages.

Jason A. Lupescu et al., "Exhaust Treatment System for Internal Combustion Engine," U.S. Appl. No. 12/579,618, filed Oct. 15, 2009, 57 pages.

Michiel J. Van Nieuwstadt, "Control of Exhaust Flow in an Engine Including a Particulate Filter," U.S. Appl. No. 12/648,833, filed Dec. 29, 2009, 38 pages.

Michiel J. Van Nieuwstadt, "Controlling Operation of Exhaust of an Engine Including a Particulate Filter," U.S. Appl. No. 12/648,839, filed Dec. 29, 2009, 38 pages.

"Applicants Statement of Related Art Known to Others", Statement as of Aug. 27, 2009, 1 Pg.

\* cited by examiner

EXHAUST SYSTEM AND METHOD FOR MITIGATING DEGRADATION OF COMPONENTS OF A TURBOCHARGED ENGINE WITH EXHAUST GAS RECIRCULATION

RELATED APPLICATIONS

This application claims priority to German Patent Application No. 102010038153.5, filed Oct. 13, 2010, the entire contents of which are herein incorporated by reference for all purposes.

FIELD

The present description relates to operating an engine of a vehicle. The system and method may be particularly useful for reducing engine component degradation of a turbocharged engine with exhaust gas recirculation (EGR).

BACKGROUND AND SUMMARY

The description relates to a particle sensor, an exhaust system and a method for the protection of components of a turbocharged engine with exhaust-gas recirculation. Exhaust-gas recirculation serves to reduce nitrogen oxide emissions generated during combustion of an air-fuel mixture in the engine. Here, the already-burned exhaust gas is supplied to the fresh-air flow supplied to the engine, and the mixture thereby generated is combusted in the engine.

DE 10 2008 001 910 A1 discloses a system for exhaust-gas recirculation, in which an optimization of the emissions in the exhaust gas is attained by means of regulation taking into consideration the NOx exhaust-gas values and particle emissions values.

DE 696 32 510 T2 discloses a nitrogen oxide sensor for measuring a NOx concentration in an exhaust gas. The described sensors and systems duly measure the concentration of pollutants in the exhaust gas but do not offer a concept for the protection of components of the engine and of the exhaust system.

The description is based on the desire of protecting components of the engine and of the exhaust system from degradation. Said desire may be achieved by way of the features of the claims. The dependent claims define advantageous refinements.

The inventor herein has recognized the above-mentioned disadvantages and has developed an engine system, comprising: an engine including at least one component other than an engine after treatment device; an exhaust system coupled to the engine; a particle sensor positioned in an exhaust system; an actuator coupled to the engine; and a controller including instructions for adjusting a position of the actuator to limit degradation of the at least one component in response to an output of the particulate sensor.

By adjusting a position of the actuator in response to an output of the particulate sensor to limit degradation of the engine component, it may be possible to extend the operating life of engine components. For example, if an amount of particulate matter exhausted from the engine exceeds a threshold amount, an EGR valve may be at least partially closed so as to reduce the amount of particulate matter that contacts vanes of a turbocharger that pressurizes air entering the engine. Thus, collection of particulate matter on turbocharger vanes may be reduced so as to limit turbocharger turbine mass and imbalance that may result if particulate matter attaches to the turbocharger turbine.

In other examples, heaters of sensors or exhaust heating elements may be activated in response to an amount of particulate matter exhausted from the engine falling below a threshold amount. The heater or heaters may be activated in response to particulate matter sensor output to detect whether condensed soluble material has evaporated after an engine start.

The present description may provide several advantages. Specifically, the approach may improve the operating life of engine components. In addition, the approach may improve engine emissions over the operating life of the vehicle by extending the operating life of engine components that may affect engine emissions. Further, the approach may improve engine fuel economy over the operating life of the vehicle via extending the operating life of engine components that may affect fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

The drawings serve merely for the explanation of the description, and do not restrict the description. The drawings and the individual parts are not necessarily drawn to scale. The reference symbols that are common to more than one figure are used to denote identical or similar parts.

DETAILED DESCRIPTION

Figure 1:
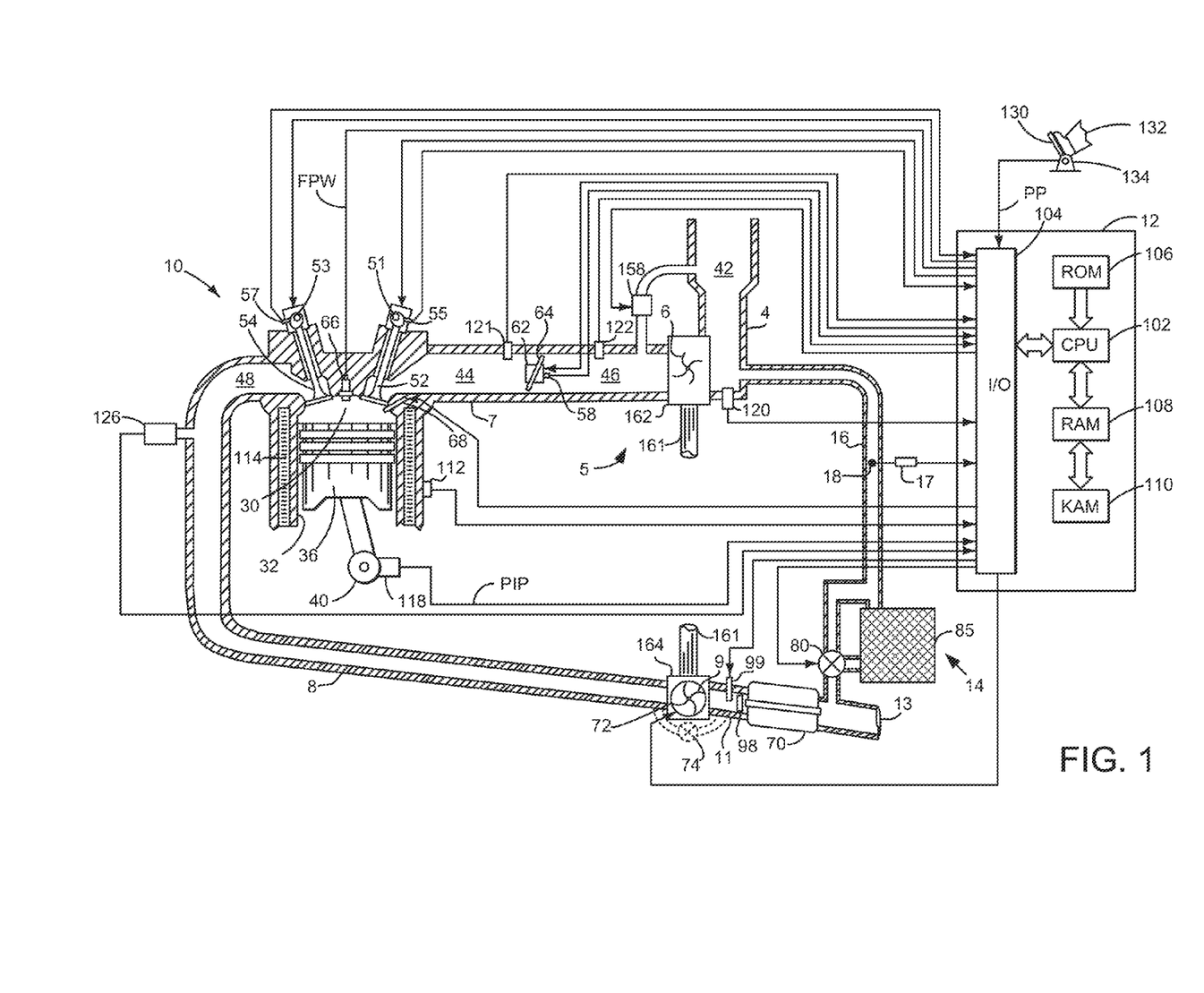
FIG. 1 is a detailed schematic diagram of an engine.
Figure 2:
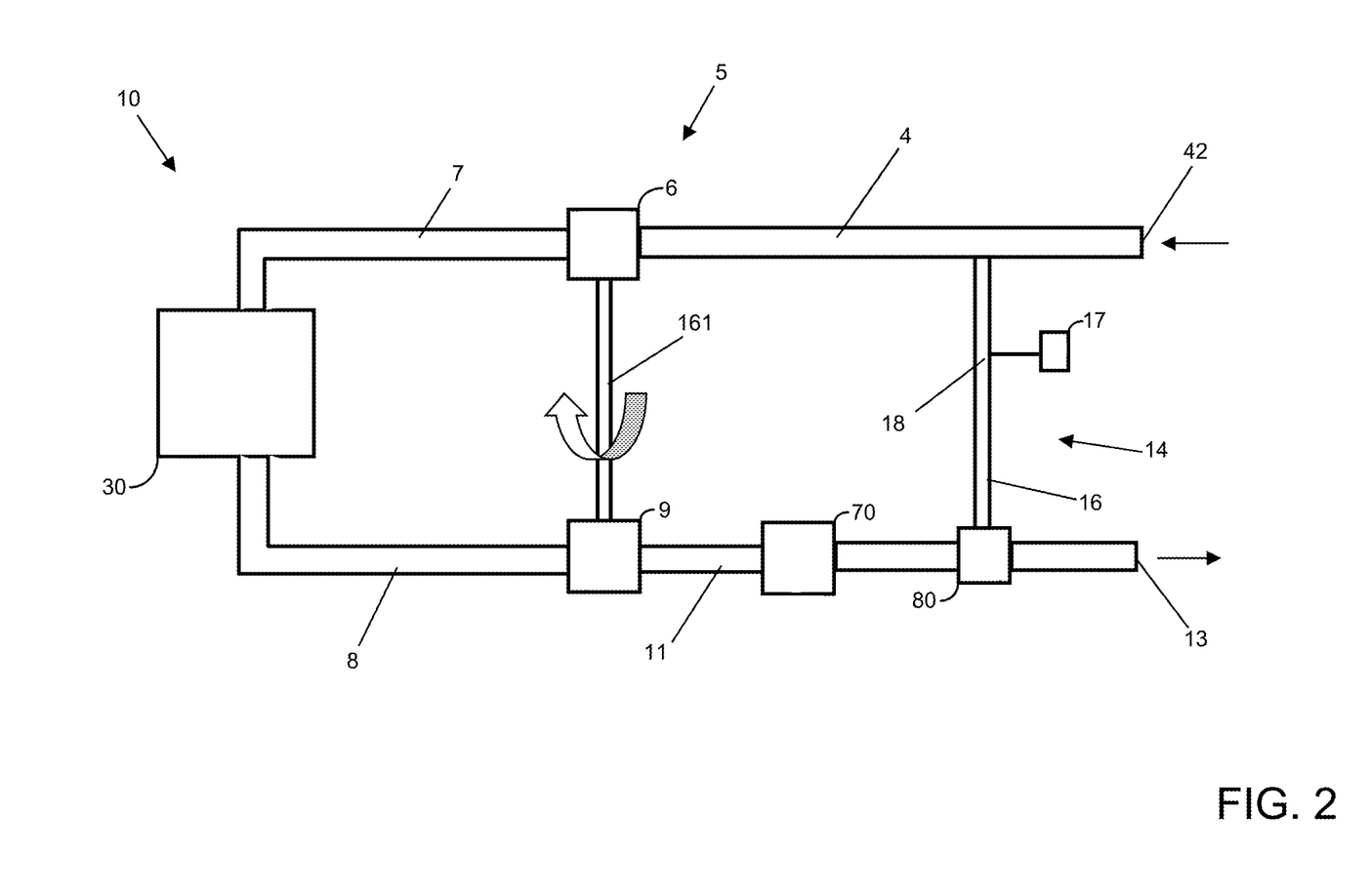
FIG. 2 is a simplified schematic diagram of the engine shown in FIG. 1 with a particulate matter sensor located in a first position.
Figure 3:
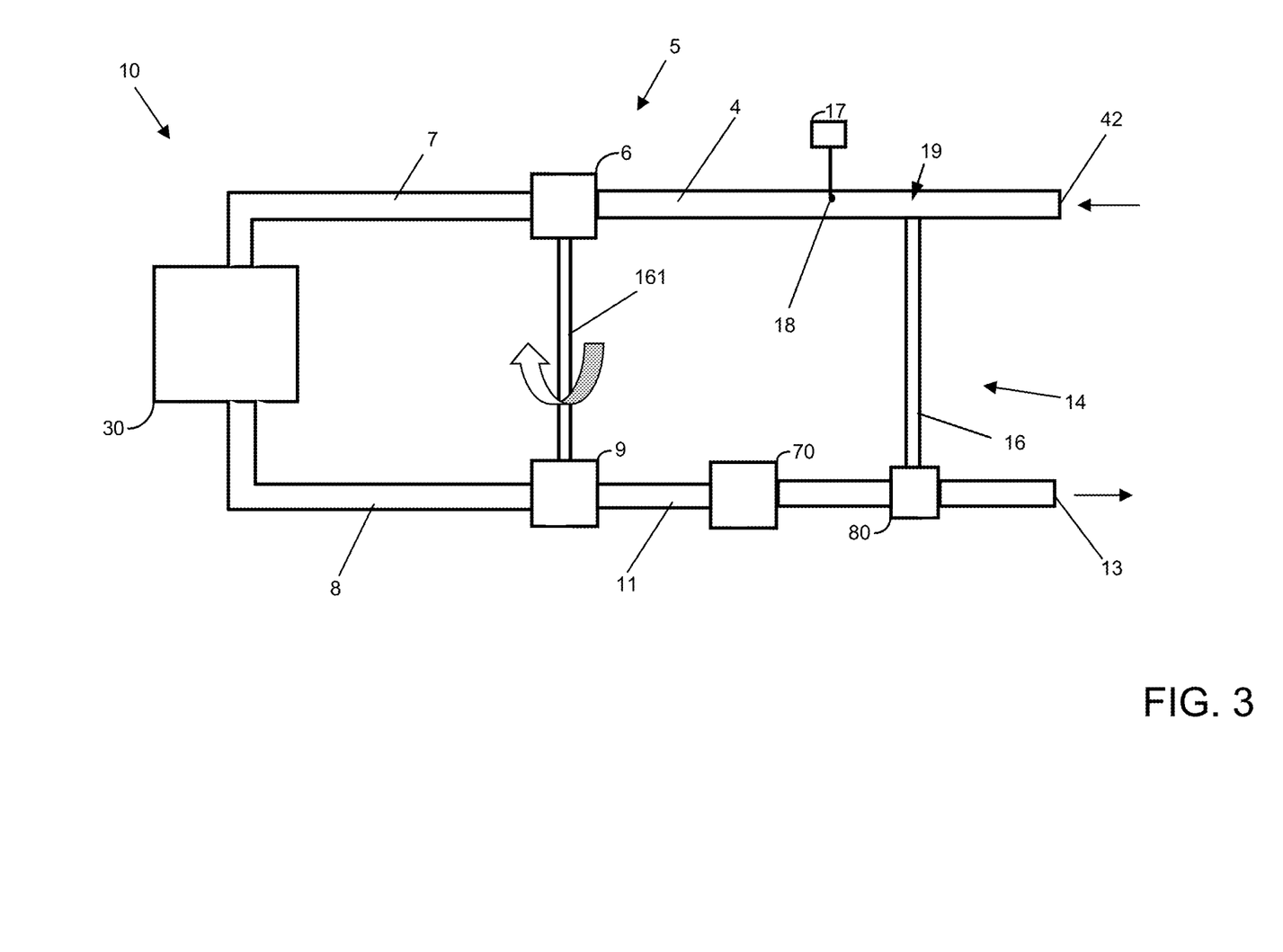
FIG. 3 is a simplified schematic diagram of the engine shown in FIG. 1 with a particulate matter sensor located in a second position.
Figure 4:
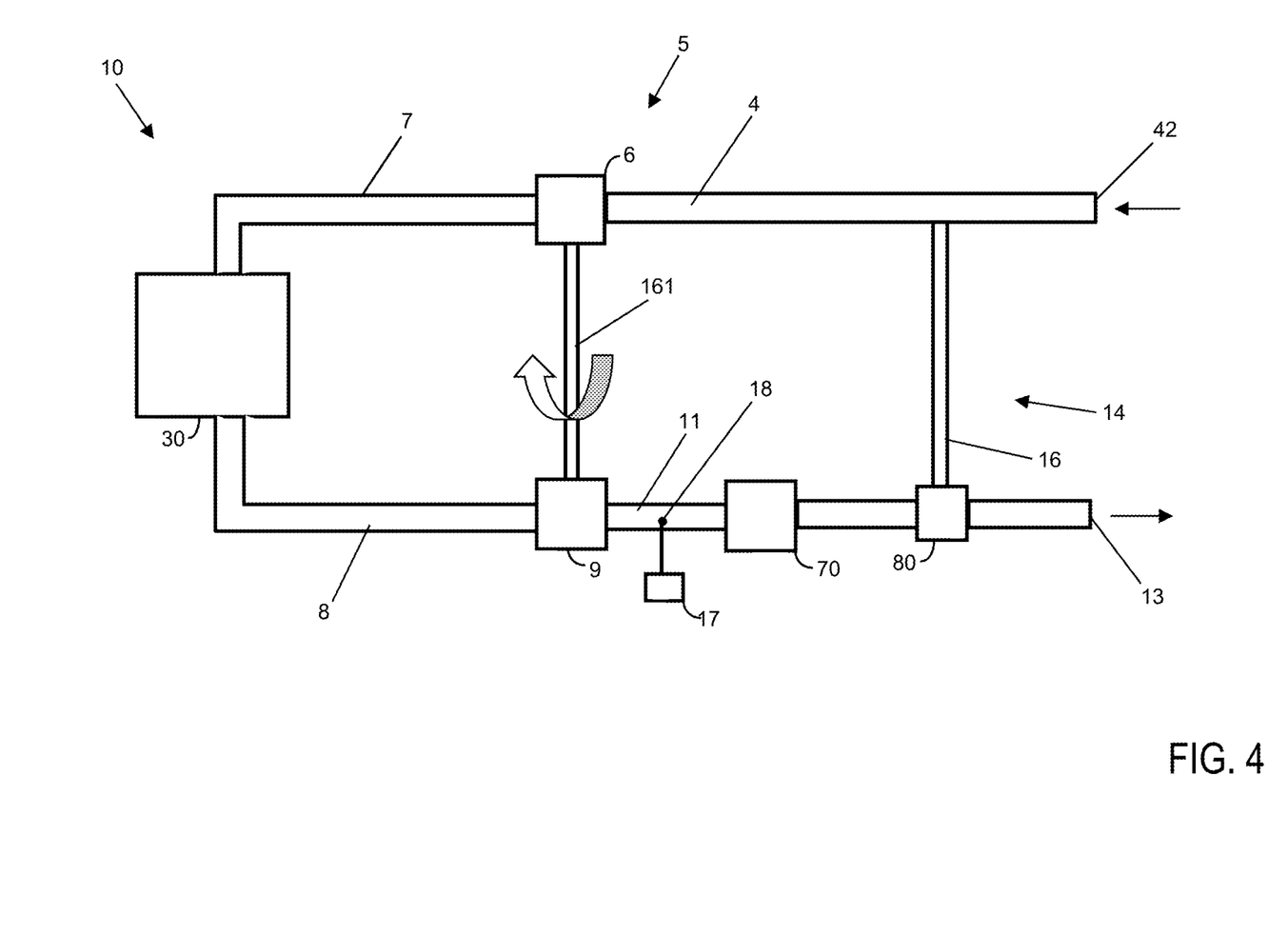
FIG. 4 is a simplified schematic diagram of the engine shown in FIG. 1 with a particulate matter sensor located in a third position.
Figure 5:
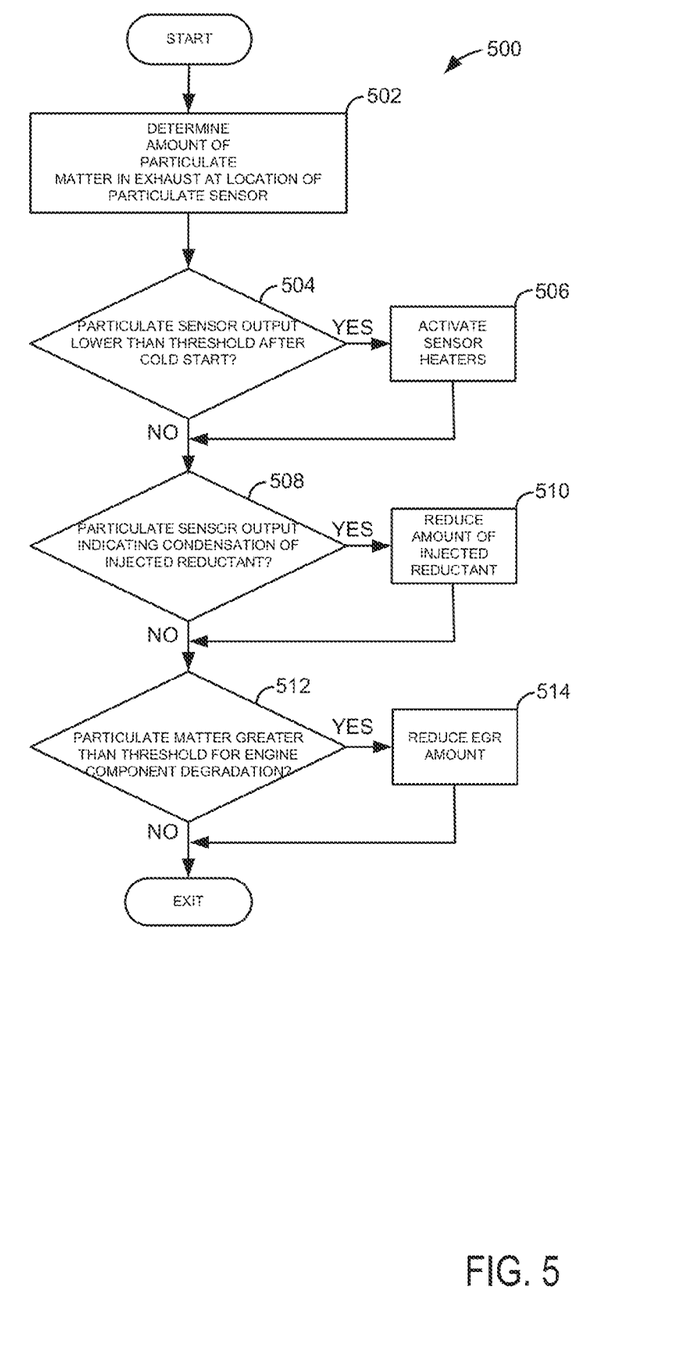
FIG. 5 is an example method for operating an engine having a particulate matter sensor.

The present description is related to controlling operation of an engine that includes a particulate matter sensor. In one non-limiting example, the particulate matter sensor may be positioned as shown in FIG. 1. In other examples, the particulate matter sensor may be positioned as shown in FIGS. 2-4 or an alternative location. The method of FIG. 5 provides for operating an engine with a particulate matter sensor and adjusting engine operation so as to limit engine component degradation in response to particulate matter sensor output.

A first aspect of the description is directed to a particle sensor for the protection of components of a turbocharged engine with exhaust-gas recirculation system, wherein the particle sensor is a low-pressure sensor arranged on a low-pressure side of the turbocharger, and wherein the particle sensor, in the presence of solid matter, outputs a signal for regulating the exhaust-gas recirculation system. The particle or solid body sensor may be used in the exhaust system to detect solid and also soluble fractions in the exhaust-gas flow. For this purpose, use is conventionally made of a resistance element whose resistance varies when substances from the exhaust gas precipitate on the sensor element. This requires regular regeneration by periodically increasing the temperature of the sensor element in order to evaporate the accumulated material. The derivative of the sensor signal with respect to time may be used to calculate the mass through flow of the solid or soluble materials in the exhaust gas. The signal of the particle sensor can regulate the exhaust-gas recirculation system, which encompasses an increase or reduction in the amount of recirculated exhaust gas, and also a complete stop of the exhaust-gas recirculation from the exhaust manifold to the engine air intake. The particle sensor allows components of the engine, such as for example the blades of the turbocharger, and components of the exhaust-gas after treatment system to be protected against degradation by particles in the exhaust-gas flow. If particles are present in the exhaust gas or if a certain threshold value is exceeded, a signal of the particle sensor can be utilized to initiate protective measures, such as the deactivation or curtailment of the exhaust-gas recirculation.

According to a second aspect of the description, an exhaust system of a turbocharged engine with exhaust-gas recirculation system comprises a particle sensor as described above. The exhaust system has the same characteristics and advantages as those described for the particle sensor.

The particle sensor may be arranged between the turbocharger and a merging point of an air supply line and the exhaust-gas recirculation system. The particle sensor is therefore arranged upstream of the turbocharger compressor in the mixed flow of fresh air and recirculated exhaust gas. If particles, or a certain amount of particles, are detected, the exhaust-gas recirculation system can be deactivated in order to protect the blades of the turbocharger. Furthermore, condensate precipitation arising during the mixing of air and exhaust gas can be detected, and the exhaust-gas recirculation system regulated correspondingly. For example, if condensate increases beyond a threshold level flow of EGR to the engine intake can be decreased.

The particle sensor may be arranged in the exhaust-gas recirculation system. If particles, or a certain amount of particles, are detected, the exhaust-gas recirculation system can be deactivated in order to protect the blades of the turbocharger from particulate matter.

The particle sensor may also be arranged upstream of components of the exhaust-gas recirculation system. In said position between the turbocharger and components of the exhaust-gas after treatment system, it may be possible, if particles arise in the exhaust gas, for countermeasures such as a change in the engine management to be implemented in order to protect the components of the exhaust-gas after treatment system against degradation. Furthermore, a misfire of the internal combustion engine can be detected as a result of a deviation of the measured particle count from the expected particle count and fuel start of injection timing may be adjusted to compensate for the misfire. In other examples, the amount of injected fuel may be increased or decreased in response to an indication of engine misfire as determined via a particulate matter sensor.

In other examples, reducing agents can be introduced into the exhaust system, and the particle sensor can output a signal for controlling the introduction of the reducing agent. If reducing agents such as for example hydrocarbons or urea are introduced to the exhaust system, the particle sensor may be used to ensure that no constituents recondense in the exhaust system. A mixer for mixing the reducing agent and the exhaust gas may be controlled by a signal of the particle sensor. For example, if particulate matter increases in the exhaust flow from the engine, the amount of reducing agent injected to the exhaust system may be increased or decreased.

According to a further aspect of the description, a method for the protection of components of a turbocharged engine with exhaust-gas recirculation comprises the steps of measurement of particles in the exhaust gas and regulation of the exhaust-gas recirculation system as a function of the measurement result. By means of the regulation of the exhaust-gas recirculation, the loading on components of the engine by particles possibly present in the exhaust gas may be reduced or eliminated because the rate of recirculated exhaust gas may be reduced.

The rate of exhaust-gas recirculation may be regulated so as to limit condensation of recirculated organic constituents. Such condensation may arise during the mixing of supplied fresh air with recirculated exhaust gas. By means of a measurement of the number of particles or of the particle mass flow in the mixed flow, the rate of exhaust-gas recirculation can be adapted correspondingly.

A misfire of the engine can be detected as a result of an increased rate of particles. A corresponding fault message may be output for example to the engine management system in order to adapt the engine operation or output a diagnostic message. The performance and expected service life of the engine can thereby be optimized.

In the event of a cold start, further sensors can be heated if the number of particles in the exhaust gas or the particulate sensor output falls below a certain threshold. These may be oxygen or NOx sensors, the activation of which may be dependent on the dew point of the water condensation. The particle sensor may detect whether the condensed soluble material has already evaporated after the start via outputting a signal indicative of particulate sensor conductivity which is influenced by condensed soluble material. If this is the case, the heaters of the further sensors can be activated. This can protect the further sensors by reducing condensation before the heater is activated, thereby reducing the possibility of heater degradation and improving the start process of the engine.

By means of the measurement of the particles, it can be detected whether the reducing agents introduced into the exhaust gas re-condense. By means of the measurement result, the introduction of reducing agents into the exhaust gas can be controlled such that it may be ensured that no re-condensation takes place. For example, the amount of reducing agents injected to the exhaust system can be decreased in response to condensation detected via the particulate matter sensor (e.g., when output of the particulate matter sensor exceeds a threshold level). The operation of the exhaust-gas after treatment system can thereby be set more effectively.

Referring now to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 via supply line 7, and electronic throttle 62 adjusts a position of throttle plate 64 to control air flow from intake boost chamber 46. Turbocharger 5 includes compressor 162 which draws air from air intake inlet 42 via inlet air line 4 and compressor vanes or blades 6 to supply air to boost chamber 46. Exhaust gases spin turbine vane or blade 9 of turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes 9. Exhaust gases can pass through turbine 164 supplying little energy to rotate turbine 164 when vanes are in an open position. Exhaust gases can pass through turbine 164 and impart increased force on turbine 164 when turbine vanes 9 are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. Discharge line 8 directs exhaust gases to turbine 164. In other examples, the UEGO sensor may be located downstream of one or more exhaust after treatment devices. Further, in some examples, the UEGO sensor may be replaced by a NOx sensor that has both NOx and oxygen sensing elements. Exhaust gas exits at exhaust system opening 13.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap, a selective catalyst reaction (SCR) catalyst, lean NOx trap (LNT), and/or a diesel particulate filter (DPF).

Exhaust gas recirculation (EGR) may be provided to the engine via EGR system 14 including EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Particulate matter sensor 17 and measuring probe 18 are shown positioned downstream of EGR valve 80 and EGR cooler 85 in a direction of exhaust flow from emissions control device 70 to engine air intake inlet 42. Connecting line or conduit 16 provides communication between the outlet of emissions control device 70 and engine air intake inlet 42. Output from particulate matter sensor 17 is input to controller 12.

Reductant such as urea or hydrocarbons may be injected into exhaust line 11 via reductant injector 99 upstream of emissions control device 70 and reductant mixer 98. The amount of reductant injected to the exhaust system may vary with engine operating conditions.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2 an internal combustion engine 10 is schematically shown. Combustion chamber 30 of the internal combustion engine 10 is also schematically illustrated. Fresh air or inlet air is supplied to the combustion chamber 30 via an air inlet 42. The inlet air is supplied through an inlet air line 4 to a turbocharger 5, more precisely to a compressor blade 6 of the turbocharger 5. The inlet air is compressed by the compressor blade 6 and supplied to the combustion chamber 30 via a supply line 7. Further components of the engine such shown in FIG. 1 are not illustrated for the sake of clarity but may be included in the configuration of FIGS. 2-4.

In the combustion chamber 30, the supplied inlet air is mixed with fuel (not illustrated) and is combusted. The exhaust gas generated here is removed from the combustion chamber 30 via a discharge line 8. The discharge line 8 leads to a turbine blade 9 of the turbocharger 5. The turbine blade 9 is coupled to the compressor blade 6 by way of a shaft 161. The turbine blade 9 is driven by the exhaust-gas flow and, by way of the shaft 161, drives the compressor blade 6, which then in turn compresses the fresh air.

The turbine blade 9 is adjoined by an exhaust line 11 which ends in an exhaust-gas opening 13, such as for example an exhaust tailpipe. Arranged in the exhaust line 11 are components of the exhaust-gas aftertreatment device 70, such as for example a catalytic converter, SCR, LNT, and/or a diesel particle filter.

The internal combustion engine 10 also comprises an exhaust-gas recirculation system 14. The exhaust-gas recirculation system 14 is a low-pressure exhaust-gas recirculation system and is therefore arranged on the low-pressure side of the turbocharger 5. An exhaust-gas recirculation valve 80 is arranged downstream of the exhaust-gas after treatment device 70. A connecting line 16 of the exhaust-gas recirculation system 14 branches off from the exhaust-gas recirculation valve 80, which connecting line connects the exhaust line 11 to the inlet air line 4. Exhaust gas is circulated into the fresh-air flow via the connecting line 16. The exhaust-gas recirculation valve 80 can open, completely close or partially open the connecting line 16. The exhaust-gas recirculation valve 80 may also be arranged upstream of the exhaust-gas after treatment device 70. In this illustration, no EGR cooler is shown but one may be provided if desired.

A particle matter or solid body sensor 17 is arranged in the connecting line 16. The particle matter sensor 17 comprises a measurement probe 18, for example a resistive measurement element, which is arranged at least partially in the connecting line 16. In one example, the particle sensor 17 which is arranged upstream of the compressor blade 6 of the turbocharger 5 detects the presence of matter or particles in engine exhaust via conduction. Matter may in this case be soluble matter such as for example condensed water vapor or unburned fuel, or non-soluble matter such as for example soot particles.

Said particles can degrade the compressor blades 6 or turbine blades 9 of the turbocharger 5 because they are circulated via the connecting line 16 from the exhaust-gas flow into the inlet air line 4. If the particle sensor 17 detects particles or the number or mass flow of particles lies above a defined threshold, the exhaust-gas recirculation valve 80 is closed, such that no exhaust gas passes via the connecting line 16 to the compressor blade 6, as a result of which the turbocharger 5 is protected against degradation. Additionally, start of injection timing and amount of fuel injected may also be adjusted so as to further control exhausted particulate matter.

The particle sensor 17 may act directly on the exhaust-gas recirculation valve 15 or may output a signal to one or more controllers 12 as shown in FIG. 1, which then in turn acts or act on the exhaust-gas recirculation valve 80. The controller may for example be an engine management system or an exhaust-gas aftertreatment system controller including executable instructions. The expression engine may encompass the exhaust-gas after treatment device 70, the exhaust-gas recirculation system 14, the turbocharger 5 and/or the lines 4, 7, 8, 11.

Referring now to FIG. 3 a second example of a turbocharged engine is shown. In particular, turbocharged engine 10 with exhaust-gas recirculation system 14, which substantially corresponds to the engine shown in FIGS. 1 and 2 is shown. In contrast to FIG. 2, the particle matter sensor 17 is arranged in the inlet air line 4. The particle sensor 17 is likewise arranged upstream of the compressor blade 6 of the turbocharger 5 but between the compressor blade 6 and a merging point 19 of the inlet air line 4 and the connecting line 16. The other components correspond to those of FIGS. 1 and 2, and therefore the above description of FIGS. 1 and 2 also applies to said components of FIG. 3.

In said position, the particle sensor 17 detects particles in the mixed flow of inlet air and recirculated exhaust gas. A condensation of circulated soluble organic constituents can thereby be identified via particulate sensor conductivity increasing in the presence of condensation or soluble organic constituents. This can usually arise during and after a cold start. Said condensation may be prevented by means of suitable thinning with fresh air, that is to say a reduction of the saturation temperature and of the pressure of the mixing. For this purpose, a signal of the particle sensor 17 is used to regulate the exhaust-gas recirculation valve 80 such that a reduced amount of exhaust gas is circulated. It may then be expedient for a particle filter to be diagnosed independently to a correct soot filtering level.

Referring now to FIG. 4, another example turbocharged engine is shown. Specifically, turbocharged engine 10 with exhaust-gas recirculation system 14, which substantially corresponds to the engine in FIGS. 1-3 is shown. In contrast to the preceding figures, the particle sensor 17 is arranged between the turbine blade 9 of the turbocharger 5 and the components of the exhaust-gas after treatment device 70. In other words, the particle sensor 17 is situated downstream of the turbine blade 9 and upstream of the exhaust-gas after treatment device 70. The other components correspond to those of FIGS. 1-3, and therefore the above description of FIGS. 1-3 also applies to said components.

The particle sensor 17 can identify an indicate an excessive increase in the rate of soluble material via changing a level of sensor output, wherein the excessive increase is in relation to a normal level for soot and reducing agent emissions as estimated by an emissions model. Said identification is a way for identifying misfires of the internal combustion engine 1, which lead to an increase in unburned droplets of fuel in the exhaust-gas flow. Said approach may be further enhanced by means of a pressure-based delta detection of the soot loading in the particle filter. Here, a correct temperature window and correct level of the mass throughput, as measured by the sensor, may be used to identify whether a higher soot loading or a misfire is responsible for the sudden increase in the mass throughput of solid particles.

In the event of a cold start of the engine 10, the activation of the heating of further sensor components such as for example an oxygen or NOx sensor 126 is dependent on the exhaust-gas temperature above the dew point temperature for water vapor condensation in the exhaust gas. The signal of the particle sensor 17 may be used to assist the activation of the heating. It may for example be provided that the heating of the further sensor components starts only after the accumulated signal for solid matter determined from the particle sensor 17 is below a defined threshold. This indicates that condensed soluble material at the cold start has been evaporated and no further condensation is taking place.

If reducing agents such as hydrocarbons or urea are injected from the outside into the exhaust-gas flow, the particle sensor 17 may be used to ensure that none of the injected matter is recondensed. For example, if the output of the particulate matter indicates condensation, the amount of injected hydrocarbons or urea may be reduced. Furthermore, the signal of the particle sensor 17 may be used to control a mixer, a swirl flap, a vortex control valve or the like which mixes the injected reducing agent with the exhaust gas. The quality of the mixture can thereby be improved, which reduces disruptive counter-pressure. Furthermore, the signal of the particle sensor 17 may be used to limit the amount of reducing agent supplied if correct reducer mixing does not take place, which may be the case if a mixer is not functioning or in the event of a restriction caused by the counter-pressure.

That which has been stated for the individual figures may also be applied to the in each case other figures. A combination of figures is likewise possible; for example, a plurality of particle sensors 17 may be provided in a system.

Thus, the systems of FIGS. 1-4 provide for an engine system, comprising: an engine including at least one component other than an emissions after treatment device or emission sensor heater; an exhaust system coupled to the engine; a particulate sensor positioned in an exhaust system; an actuator coupled to the engine; and a controller including instructions for adjusting a position of the actuator to limit degradation of the at least one component in response to an output of the particulate sensor. The engine system further comprises a turbocharger, and where the particulate sensor is positioned downstream of the turbocharger. In this way, the output of the particulate matter sensor may be the basis for limiting degradation of the turbocharger.

The engine system also includes where the at least one component is other than the actuator. In some examples, the actuator is an EGR valve. Further, the at least one component is a compressor vane that may be protected from degradation. The engine system also includes where the at least one component is a turbine vane.

In another example, the engine system comprises an engine including at least one component other than an emissions after treatment device or emission sensor heater; an exhaust system coupled to the engine and including a reductant injector; a particulate sensor positioned in an exhaust system; an actuator coupled to the engine; and a controller including instructions for adjusting a position of the actuator to limit physical degradation (e.g., degradation of structure of a material such as a vane or housing) of the at least one component and an amount of condensed reductant injected from the reductant injector in response to an output of the particulate sensor. The engine system includes where the reductant injector injects urea to the engine exhaust system. In other examples, the engine system includes where the reductant injector injects a hydrocarbon. The engine system also includes where the controller includes additional instructions for reducing an amount of reductant injected to the exhaust system in response to an output of the particulate sensor. The engine system further comprises an exhaust sensor including a heater and additional controller instructions to activate the heater after an engine start in response to an output of the particulate sensor.

The engine system also includes where the heater is activated in response to output of the particulate sensor less than a threshold level so as to prevent heater degradation. The engine system also includes where the at least one component is a turbocharger and where the turbocharger vane exposure to particulate matter is reduced. In some examples, the engine system includes where the particulate sensor is positioned in a line between an exhaust line and an engine air intake line.

Referring now to FIG. 5 a method for operating an engine having a particulate matter sensor is shown. The method of FIG. 5 is executable via instructions of controller 12 shown in FIG. 1.

At 502, method 500 determines an amount of particulate matter or the presence of condensed solution at a location of a particulate matter sensor as shown in FIGS. 1-4. In one example, the output of the particulate matter sensor increases for increasing amounts of particulate matter in the engine exhaust. Further, the output of the particulate matter sensor may increase when a condensation forms at the particulate matter sensor. In one example, the output of the particulate matter sensor increases in response to water at the particulate sensor. However, in other examples the output of the particulate matter sensor may decrease in the presence of increasing particulate matter in the engine exhaust or in response to water or a liquid solution at the particulate matter sensor. The output of the particulate matter sensor may be determined and stored in memory of the controller. Method 500 proceeds to 504 after particulate matter sensor output is determined.

At 504, method 500 judges whether or not output of the particulate matter sensor is lower than a threshold amount after an engine start. In some examples, output of a particulate sensor may increase in response to presence of condensation or water on a particulate matter sensor. Further, water vapor may condense in an exhaust system shortly after an engine start when warm exhaust gases encounter cool components in the engine exhaust system. Thus, when the output of the particulate matter sensor is less than a threshold level, it may be determined that water condensation in the exhaust system at the location of the particulate matter sensor is gone. Consequently, heaters of exhaust system sensors or exhaust heaters may be activated at a time when the presence of condensed water is reduced so as to reduce heater degradation. On the other hand, heaters may not be activated until output of the particulate filter sensor is greater than a threshold level when condensation is not indicated via a particulate filter sensor output greater than a threshold level. If method 500 judges that condensation at a particulate matter sensor after a cold start is less than a threshold, method 500 proceeds to 506. Otherwise, method 500 proceeds to 508.

At 506, method 500 activates sensor heaters (e.g., an oxygen or NOx sensor heater). Further, in some examples, exhaust gas heaters may be activated after the output of the particulate matter sensor indicates condensation less than a threshold level. Method 500 proceeds to 508 after heaters are activated.

At 508, method 500 judges whether or not particulate matter sensor output indicates condensation of reductant that has been injected into the exhaust system. The reductant may be hydrocarbons or urea. In one example, the output of the particulate matter sensor increases in response to condensation of reductant at the particulate sensor.

In other examples, the output of the particulate matter sensor may decrease in response to the presence of condensed reductant. If method 500 judges that more than a threshold amount of reductant is sensed by the particulate matter sensor, method 500 proceeds to 510. Otherwise, method 500 proceeds to 512. Note that in one example, the presence of condensed reductant is assessed only after injection of reductant has commenced.

At 510, method 500 reduces the amount of injected reductant. In one example, the amount of injected reductant may be reduced proportionally to the output of the particulate matter sensor. Method 500 proceeds to 512 after the amount of reductant injected to the engine exhaust system is reduced. In some examples, the amount of reductant injected to the engine may be decreased to zero.

At 512, method 500 judges whether or not an amount of particulate matter in the engine exhaust exceeds a threshold level. If particulate matter in engine exhaust exceeds a threshold level, method 500 proceeds to 514. Otherwise, method 500 proceeds to exit. Excess particulate matter in exhaust may cause operation of an engine component or exhaust system component to degrade if mitigating actions are not taken. For example, particulate matter may increase the mass of a turbine or compressor blade so as to reduce the speed that the compressor or turbine may rotate without causing degradation of a turbocharger. In another example, particulate matter greater than a threshold amount can degrade operation of an emissions control device via restricting interaction between exhaust gases and the emissions control device. Therefore, when particulate matter in the engine exhaust is greater than a threshold amount, method 500 proceeds to 514 where EGR is reduced. In one example, method 500 proceeds to 514 when particulate matter in engine exhaust exceeds a threshold level for degrading an engine component other than an exhaust gas after treatment device (e.g., particulate filter, SCR, LNT, catalyst). Method 500 proceeds to exit if method 500 determines that particulate matter in engine exhaust is less than a threshold level where an engine component may degrade.

At 514, method 514 reduces engine EGR. Engine EGR may be reduced by partially or fully closing an EGR valve. In other examples, EGR may be reduced via adjusting timing of intake and exhaust valve camshafts. Further, in some examples, start of fuel injection timing and fuel injection amount may be adjusted so as to reduce particulate matter production. For example, the amount of fuel injected can be decreased in response to particulate matter in exhaust increasing to a level where degradation of an engine component may result. Method 500 proceeds to exit after engine EGR amount is reduced.

Thus, the method of FIG. 5 provides for a method for operating an engine, comprising: adjusting an amount of EGR supplied to an engine in response to output of a particulate matter sensor indicating an amount of particulate matter in engine exhaust exceeding a level indicative of degradation of an engine component other than an emission after treatment device or emission sensor. The method includes where the amount of EGR supplied to the engine is adjusted via adjusting a position of an EGR valve. The method also includes where the engine component is a turbocharger vane. In one example, the method includes where the turbocharger vane is a compressor vane. Further, the turbocharger vane is a turbine vane. The method further comprises adjusting an amount of reductant injected to an exhaust system coupled to the engine in response to an output of the particulate matter sensor.

As will be appreciated by one of ordinary skill in the art, routines described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
an engine including intake and exhaust camshafts and at least one component other than an emissions after treatment device or emissions sensor;
an exhaust system coupled to the engine;
a particulate sensor positioned in an exhaust system; and
a controller including instructions stored in non-transitory memory for adjusting a position of the intake and exhaust camshafts to limit degradation of the at least one component in response to an output of the particulate sensor, and further instructions for adjusting an amount of reductant injected to the exhaust system in response to condensation of reductant indicated via the particulate sensor.

2. The engine system of claim 1, further comprising a turbocharger, and where the particulate sensor is positioned downstream of the turbocharger.

3. The engine system of claim 1, where the at least one component is other than the intake and exhaust camshafts.

4. The engine system of claim 1, where the particulate sensor indicates condensation of reductant via output of the particulate sensor being greater than a threshold level.

5. The engine system of claim 1, where the at least one component is a compressor vane.

6. The engine system of claim 1, where the at least one component is a turbine vane.

7. An engine system, comprising:
an engine including at least one component other than an emissions after treatment device;
an exhaust system coupled to the engine and including a reductant injector;
a particulate sensor positioned in an exhaust system;
an actuator coupled to the engine; and
a controller including instructions stored in non-transitory memory for adjusting a position of the actuator to limit physical degradation of the at least one component and an amount of reductant injected from the reductant injector in response to condensation of reductant indicated via the particulate sensor.

8. The engine system of claim 7, where the reductant injector injects urea, and where the particulate sensor indicates condensation of reductant via output of the particulate sensor being greater than a threshold level.

9. The engine system of claim 7, where the reductant injector injects a hydrocarbon.

10. The engine system of claim 7, where the controller includes additional instructions for reducing an amount of reductant injected to the exhaust system in response to an output of the particulate sensor.

11. The engine system of claim 7, further comprising an exhaust sensor including a heater and additional controller instructions to activate the heater after an engine start in response to an output of the particulate sensor.

12. The engine system of claim 11, where the heater is activated in response to an output of the particulate sensor less than a threshold level.

13. The engine system of claim 7, where the at least one component is a turbocharger.

14. The engine system of claim 7, where the particulate sensor is positioned in a line between an exhaust line and an engine air intake line.

15. A method for operating an engine, comprising:
adjusting an amount of EGR supplied to an engine via adjusting intake and exhaust valve timing in response to output of a particulate matter sensor indicating an amount of particulate matter in engine exhaust exceeding a level indicative of degradation of an engine turbocharger component; and
adjusting an amount of reductant injected to an exhaust system coupled to the engine in response to condensation of reductant indicated via the particulate matter sensor.

16. The method of claim 15, further comprising activating a heater in response to output of the particulate matter sensor.

17. The method of claim 15, where the engine turbocharger component is a turbocharger vane.

18. The method of claim 17, where the turbocharger vane is a compressor vane.

19. The method of claim 17, where the turbocharger vane is a turbine vane.

20. The method of claim 15, where the particulate matter sensor indicates condensation of reductant via output of the particulate matter sensor being greater than a threshold level.

* * * * *